United States Patent
Gross (10) Patent No.: US 8,608,512 B2
(45) Date of Patent: Dec. 17, 2013

(54) CABLE CONNECTOR

(75) Inventor: Charles M. Gross, Etters, PA (US)

(73) Assignee: FCI Americas Technology, LLC, Carson City, NV (US)

( * ) Notice: Subject to any disclaimer, the term of this patent is extended or adjusted under 35 U.S.C. 154(b) by 16 days.

(21) Appl. No.: 13/426,778

(22) Filed: Mar. 22, 2012

(65) Prior Publication Data

US 2012/0264337 A1  Oct. 18, 2012

Related U.S. Application Data

(60) Provisional application No. 61/517,325, filed on Apr. 18, 2011.

(51) Int. Cl.
*H01R 24/00* (2011.01)

(52) U.S. Cl.
USPC ............................................. 439/660

(58) Field of Classification Search
USPC .............. 439/660, 357, 352, 494, 272, 676
See application file for complete search history.

(56) References Cited

U.S. PATENT DOCUMENTS

| | | | |
|---|---|---|---|
| 3,149,897 A * | 9/1964 | Martineck | 439/494 |
| 3,189,864 A * | 6/1965 | Angele et al. | 439/494 |
| 3,855,567 A | 12/1974 | Harms et al. | 339/61 M |
| 4,398,785 A | 8/1983 | Hedrick | |
| 5,358,417 A | 10/1994 | Schmedding | 439/178 |
| 5,999,400 A | 12/1999 | Belopolsky et al. | 361/600 |
| 6,004,160 A * | 12/1999 | Korsunsky et al. | 439/660 |
| 6,071,127 A * | 6/2000 | Acke et al. | 439/63 |
| 6,527,592 B2 * | 3/2003 | Mochizuki et al. | 439/660 |
| 6,793,537 B2 * | 9/2004 | Stefaniu et al. | 439/660 |
| 6,860,755 B2 * | 3/2005 | Wang et al. | 439/498 |
| 7,217,158 B2 * | 5/2007 | Shimizu | 439/607.23 |
| 7,654,850 B2 * | 2/2010 | Shimizu | 439/352 |
| 2006/0035523 A1 * | 2/2006 | Kuroda et al. | 439/610 |

FOREIGN PATENT DOCUMENTS

EP  0 768 739 A2  4/1997

* cited by examiner

*Primary Examiner* — Alexander Gilman
(74) *Attorney, Agent, or Firm* — Harrington & Smith (57) ABSTRACT

An assembly including an electrical wire and a plug housing forming an electrical connector. The electrical wire includes an electrical conductor and electrical insulation surrounding the electrical conductor. An end of the electrical conductor is not surrounded by the electrical insulation. The plug housing is on the end of the electrical wire. The plug housing covers a bottom of the end of the electrical conductor and covers a first portion of a front side of the end of the electrical conductor. The plug housing does not cover a top of the end and does not cover a second portion of the front side such that the top of the end and the second portion are exposed to be able to electrically contact an electrical contact of a mating electrical connector.

18 Claims, 7 Drawing Sheets

CABLE CONNECTOR

CROSS REFERENCE TO RELATED APPLICATIONS

This application claims priority on U.S. provisional patent application No. 61/517,325 filed Apr. 18, 2011 which is hereby incorporated by reference in its entirety.

BACKGROUND

1. Technical Field

The exemplary and non-limiting embodiments of the invention relate generally to an electrical connector and, more particularly, to a cable connector.

2. Brief Description of Prior Developments

U.S. Pat. No. 4,398,785 discloses a plug with a housing overmolded onto a wire. U.S. Pat. No. 3,189,864 discloses an electrical connector for flat cables.

SUMMARY

The following summary is merely intended to be exemplary. The summary is not intended to limit scope.

In accordance with one aspect, an assembly is provided including an electrical wire and a plug housing forming an electrical connector. The electrical wire includes an electrical conductor and electrical insulation surrounding the electrical conductor. An end of the electrical conductor is not surrounded by the electrical insulation. The plug housing is on the end of the electrical wire. The plug housing covers a bottom of the end of the electrical conductor and covers a first portion of a front side of the end of the electrical conductor. The plug housing does not cover a top of the end and does not cover a second portion of the front side such that the top of the end and the second portion are exposed to be able to electrically contact an electrical contact of a mating electrical connector.

In accordance with another aspect, an electrical connector is provided comprising a housing and a plurality of electrical contacts. The housing forms a mating connector receiving area. The plurality of electrical contacts are connected to the housing. The contacts each comprise a first end forming a mating connector connection end, and a second end forming a component connection end. The second end is adapted to be stationarily connected to an electrical component. The housing covers a first side of the first end of the electrical contact and covers a first portion of a front side of the first end. The housing does not cover a second side of the first end at the mating connector receiving area and does not cover a second portion of the front side such that the second side and the second portion are exposed to be able to electrically contact an electrical contact of a mating electrical connector inserted into the mating connector receiving area.

In accordance with another aspect, a method comprises providing at least one electrical wire comprising an electrical conductor and electrical insulation surrounding the electrical conductor, where an end of the electrical conductor is not surrounded by the electrical insulation; and molding a plug housing onto the end of the at least one electrical wire to form an electrical connector, where the plug housing covers a bottom of the end of the electrical conductor and covers a first portion of a front side of the end of the electrical conductor, and where the plug housing does not cover a top of the end and a second portion of the front side such that the top and second portion are exposed to be able to electrically contact an electrical contact of a mating electrical connector.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
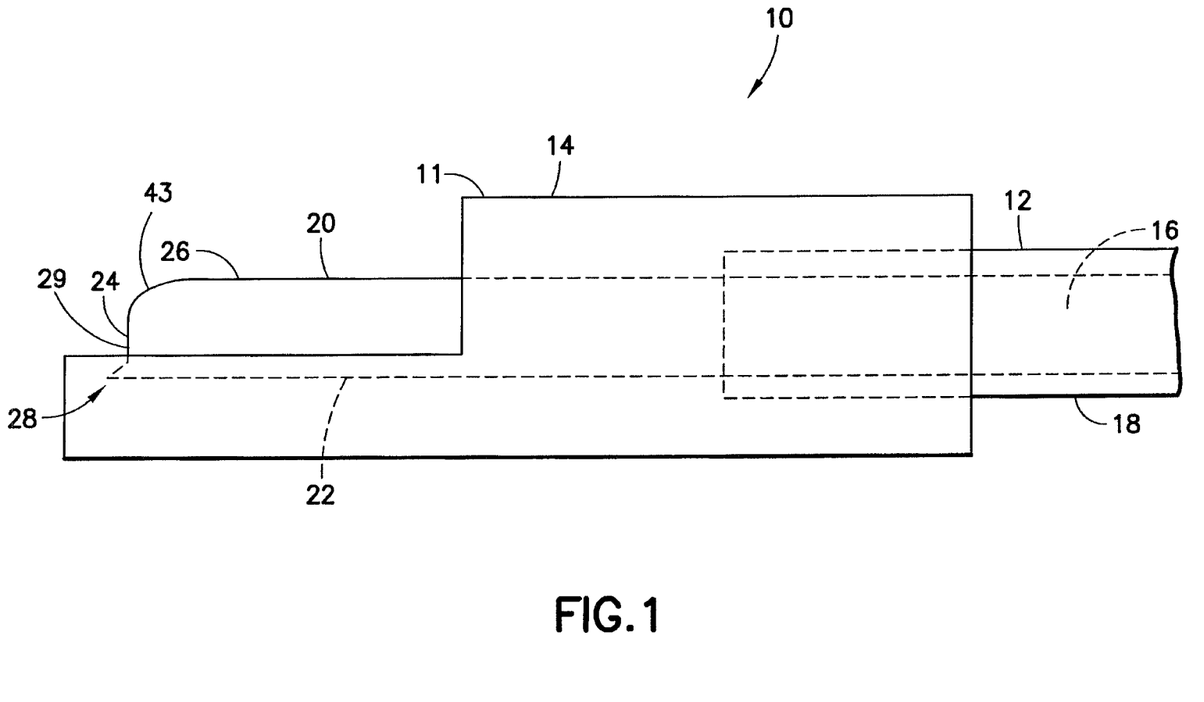
FIG. 1 is a side view of an end of a cable assembly comprising an example embodiment of an electrical connector.

Referring to FIG. 1, there is shown a side view of an assembly 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The assembly 10 comprises at least one wire 12 and a housing 14. The housing 14 and portions of the wires 12 form an electrical connector 11. Each wire 12 has a wire electrical conductor 16 and an electrical insulator cover 18. In this example the wires are conventional copper wires. As seen with reference also to FIG. 2, in this example the assembly has three of the wires 12 and conductors 16. However, more or less wires would be provided, or a cable with multiple separated electrical conductors and a single insulator cover could be provided. The conductors 16 have a general circular cross section. The insulation 18 is removed from an end of the wires 12, and the housing 14 is overmolded and/or encapsulated onto the ends 20 of the conductors 16. However, the overmolding leaves a portion of the wires 16 exposed. In one type of example embodiment the wires 12 may be contained in a cable cover which the housing 14 is also molded onto. Overmolding the housing 14 onto the insulation 18 and/or cable cover forms a strain relief feature for the assembly 10.

Figure 2:
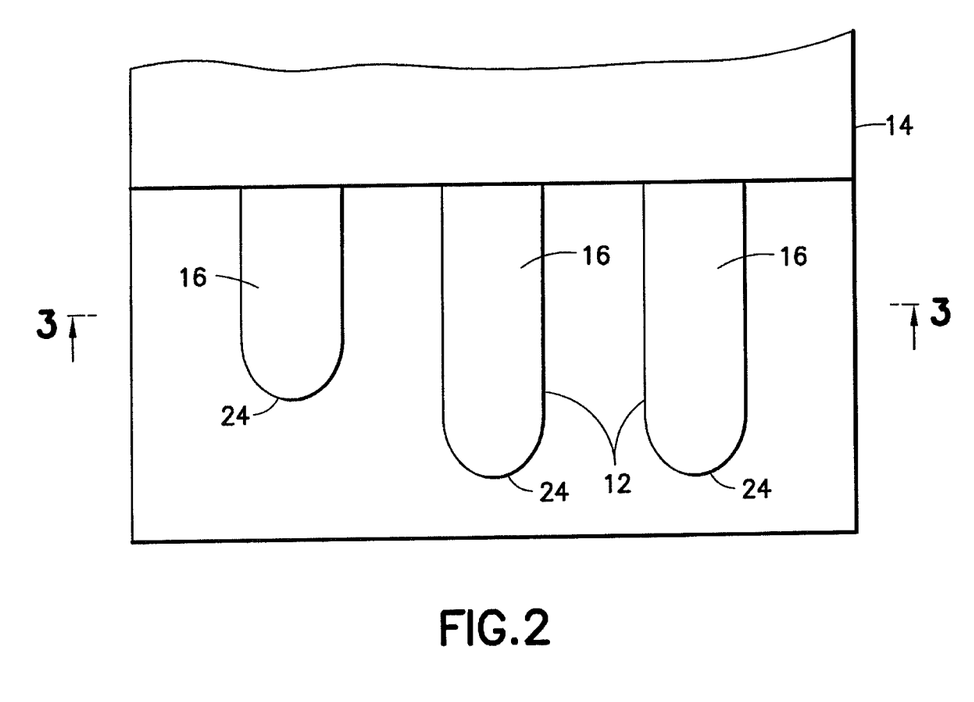
FIG. 2 is a top side plan view of a portion of the electrical connector shown in FIG. 1.
Figure 3:
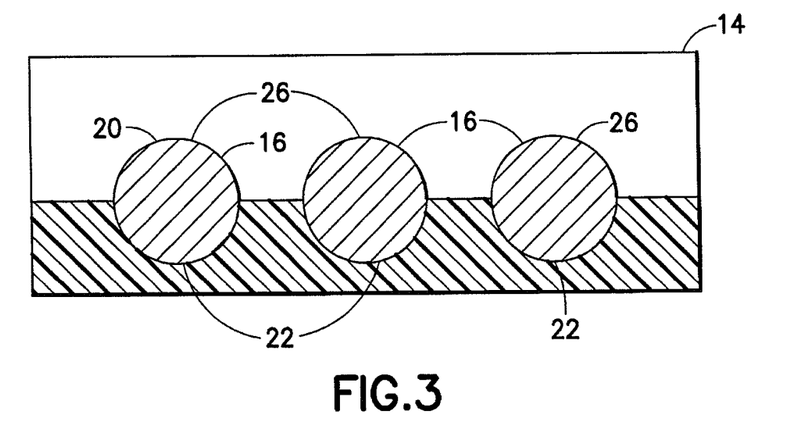
FIG. 3 is a cross sectional view of the electrical connector shown in FIG. 2 taken along line 3-3.

Referring also to FIG. 3, the housing 14 is overmolded onto the bottom sides 22 and a first portion of the front side 24 (see FIG. 1) of the conductors 16. This leaves the top sides 26 and a second portion 29 of the front side 24 exposed; not covered by the housing 14. In this embodiment the front side 24 has a first portion forming a retainer projection 28, such as formed by the tip of the wire conductor 16 being swaged. This can prevent lift up of the front side 24 from the housing 14, and act as a lock keeping the conductor end 20 securely attached to the housing 14. Additional and/or alternative securing means could be provided. In this example, as seen in FIG. 2, the front sides 24 are staggered and perhaps rounded for easier mating with the mating electrical connector. The housing 14 provides rigid support under the end 20 of the wire conductors. The second portion 29 of the front side is not covered by the material of the plug housing 14. The molded plug housing 14 contains the ends 20 of the conductors without the need to use a printed circuit board.

Figure 4:
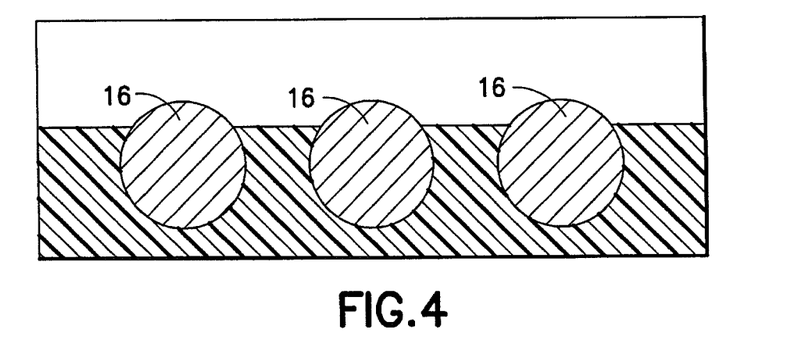
FIG. 4 is a cross sectional view similar to FIG. 3 of an alternate example embodiment.
Figure 5:
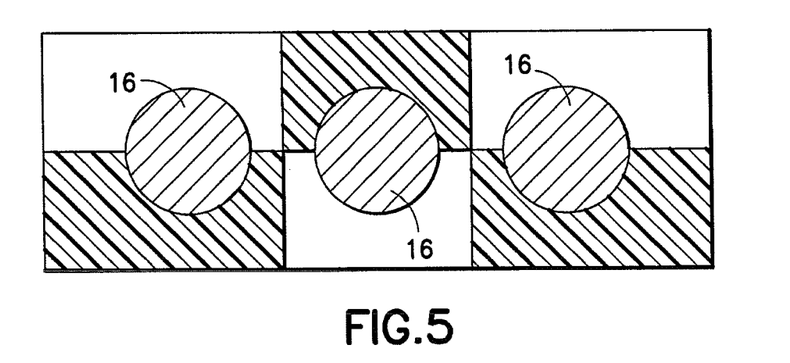
FIG. 5 is a cross sectional view similar to FIG. 3 of another alternate example embodiment.

FIG. 4 illustrates an alternate embodiment where merely the apex of the top side of the conductors 16 are exposed. A first portion of the front side of the wires would have a projection, such as by being swaged, surrounded by the molded housing, and a second portion of the front side of the conductors would also be exposed and ramped to function as a lead-in for the contacts of the mating connector. The molded wall portion between the conductors 16 helps to prevent cross talk or shorts. FIG. 5 illustrates an alternate embodiment where alternating top and bottom sides of adjacent conductors 16 are exposed.

Figure 6:
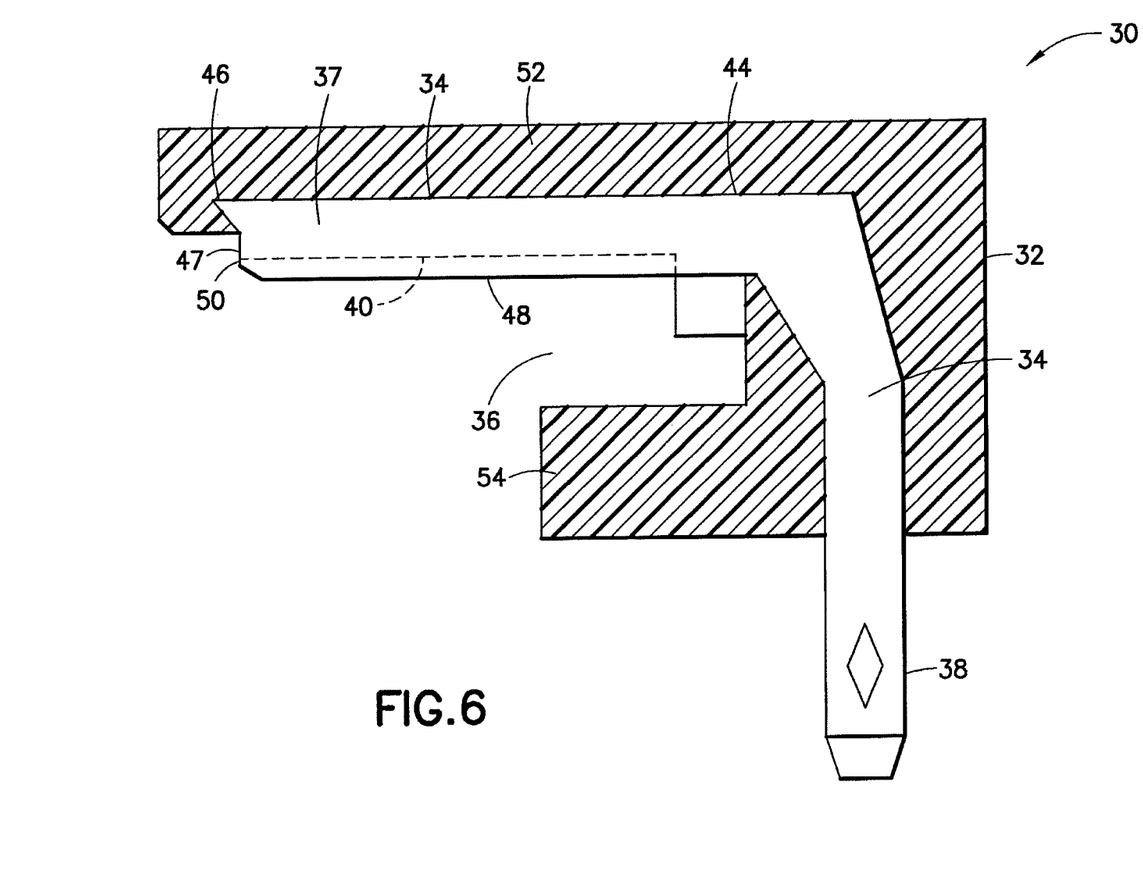
FIG. 6 is a cross sectional view of a socket electrical connector of an example embodiment.
Figure 7:
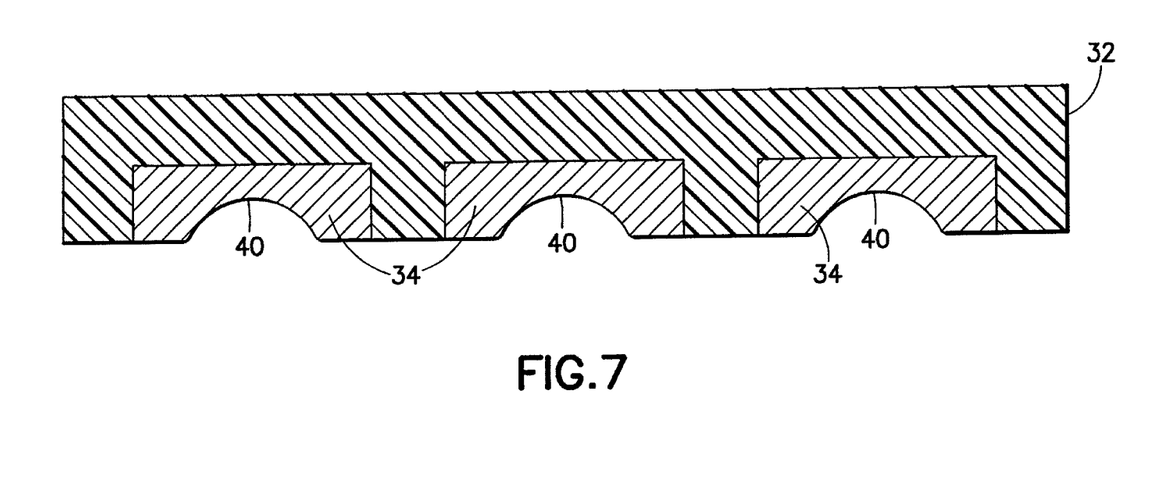
FIG. 7 is a cross sectional view of the socket connector shown in FIG. 6.

FIG. 6 illustrated an example embodiment of a mating electrical connector 30. The connector 30 has a housing 32 and contacts 34. The contacts 34 may be stamped conductors for example with the housing 32 insert molded thereon for example. In this example the contacts 34 have ends 38 which are configured to be through hole mounted in holes of a printed circuit board. The connector 30 forms a receiving area 36 to receive the front end of the connector 11. Referring also to FIG. 7, in this example the contacts 34 have concave areas or grooves 40 to receive the top sides 26 of the conductors 16. Ends 38 may be press fit, BGA surface mount, other surface mount, or a through-hole mounting for example.

Figure 8:
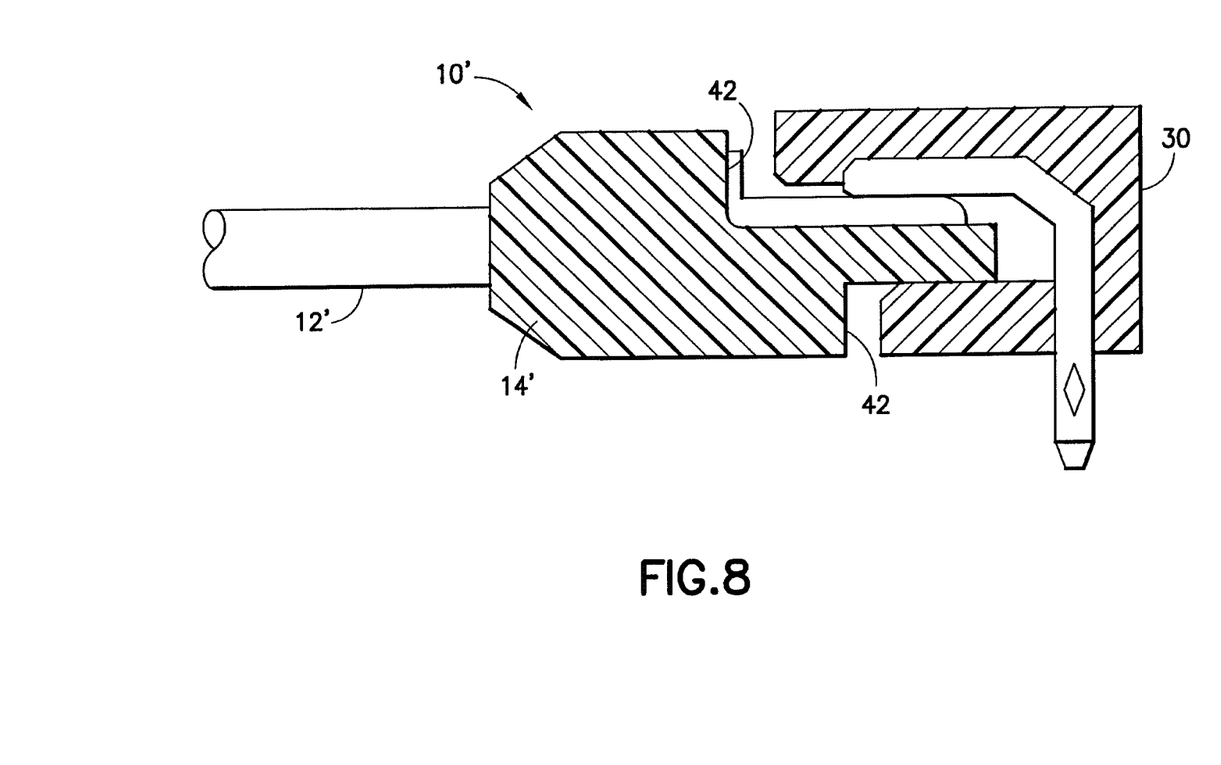
FIG. 8 is a schematic cross sectional view showing an assembly of the two connectors of FIGS. 1 and 6 to each other.

FIG. 8 illustrates another example of the assembly 10', but shown being connected to the mating connector 30. In this example the housing 14' has stops to interact with stops of the mating connector 30. The housing 14' provides strain relief for the cable 12'.

Example embodiments provide a cable connector system without use of a PCB as an interface to the mating connector; intended to eliminate use of the PCB or paddle card. Cable/wires may be molded to provide desired spacing and mechanical support. The example embodiments described herein make it possible to eliminate a paddle card from a cable assembly.

The examples described above provide a cable connection without a PCB on the connector 11. Normal force is provided by the molded connector and molded wire. An audible lock feature can be incorporated into the connector. The connector has a small footprint for mated systems. The concave terminal accepts a conventional copper wire conductor having a circular cross section. Integrated stops can prevent over mating of the system. Staged mating can be provided. Can be used for signal and power connections. The one-up:one-down pattern can provide alternating contact areas. A wall may be molded between wires conductors to prevent shorting/cross-talk. The one-up and one-down configuration can provide polarized mating.

In one type of example embodiment an assembly 10 may be provided comprising:
  at least one electrical wire 12 comprising an electrical conductor 16 and electrical insulation 18 surrounding the electrical conductor, where an end 20 of the electrical conductor is not surrounded by the electrical insulation; and
  a plug housing 14 on the end of the at least one electrical wire 12 to form an electrical connector, where the plug housing 14 covers a bottom 22 of the end of the electrical conductor and covers a first portion 28 of a front side 24 of the end of the electrical conductor, and where the plug housing does not cover a top 26 of the end and does not cover a second portion 29 of the front side such that the top 26 of the end and the second portion 29 are exposed to be able to electrically contact an electrical contact of a mating electrical connector.

The plug housing may comprise an overmolded member 14 which is overmolded onto the electrical insulation. The electrical conductor 16 may have a general circular cross sectional shape along a majority of length of the end of the electrical conductor. The first portion of the front side may have a projection 28 extending into the plug housing 14 from the front side 24. The electrical conductor 16 may be a metal wire and the projection 28 may comprise a swaged projection formed from the metal wire. A rounded transition surface 43 may be provided between the front side 24 of the end and the top 26 of the end. The at least one electrical wire may comprise multiple electrical wires 12 connected by the plug housing. As seen in FIG. 2, at least one of the electrical wires may have a shorter length at the end than another one of the electrical wires. This feature need not be provided, but allows a wire acting as a ground to make contact with the mating connector before another one of the wires acting as a signal contact. An electrical connector assembly may be provided comprising:
  an assembly as described above forming a plug electrical connector; and
  a mating electrical connector having the electrical connector of the assembly connected thereto, where the mating electrical connector comprises:
    a mating connector housing forming a mating connector receiving area; and
    a plurality of electrical contacts connected to the mating connector housing, where the contacts each comprise a first end forming a mating connector connection end, and a second end forming a component connection end,
    where the second end is adapted to be stationarily connected to an electrical component,
    where the mating connector housing covers a first side of the first end of the electrical contact, where the housing covers a first portion of a front side of the first end of the electrical contact,
    where the housing does not cover a second side of the first end of the electrical contact at the mating connector receiving area and does not cover a second portion of the front side of the electrical contact such that the second side and the second portion are exposed to electrically contact the electrical conductor of the at least one electrical wire inserted into the mating connector receiving area.

In another example embodiment, an electrical connector may be provided comprising:
  a housing 32 forming a mating connector receiving area 36; and
  a plurality of electrical contacts 34 connected to the housing, where the contacts each comprise a first end 37 forming a mating connector connection end, and a second end 38 forming a component connection end,
  where the second end 38 is adapted to be stationarily connected to an electrical component, where the housing 32 covers a first side 44 of the first end 37 of the electrical contact, where the housing covers a first portion 46 of a front side 47 of the first end,
  where the housing 32 does not cover a second side 48 of the first end at the mating connector receiving area 36 and does not cover a second portion 50 of the front side 47 such that the second side 48 and the second portion 50 are exposed to be able to electrically contact an electrical contact of a mating electrical connector inserted into the mating connector receiving area.

The second end 38 is a mounting end which may be press fit, or BGA surface mount, or other surface mount, or through-hole solder tail mounting or example. The second end 38 may comprise a solder tail configured to be connected to a printed circuit board. The housing 32 may be insert molded onto the electrical contacts 34. The second side 48 of the first end 37 may have a general concave cross section. The electrical contacts 34 may have a general right angle shape. The first portion 46 of the front side 47 may have a projection extending into the plug housing from the front side. The mating connector receiving area 36 may be formed as a slot extending into a front of the housing 32 between a top portion 52 of the housing having the first end 37 of the electrical contacts at a bottom side of the top portion, and a bottom portion 54 located opposite and spaced from the top portion.

One example method may comprise providing at least one electrical wire 12 comprising an electrical conductor 16 and electrical insulation 18 surrounding the electrical conductor, where an end 20 of the electrical conductor is not surrounded by the electrical insulation; and molding a plug housing 14 onto the end 20 of the at least one electrical wire to form an electrical connector, where the plug housing covers a bottom 22 of the end of the electrical conductor and covers a first portion 28 of a front side of the end of the electrical conductor, and where the plug housing 14 does not cover a top 26 of the end and a second portion 29 of the front side such that the top and second portion are exposed to be able to electrically contact an electrical contact of a mating electrical connector.

The plug housing 14 may be overmolded onto the electrical insulation 18. The method may comprise providing the first portion of the front side with a projection which extends into the plug housing from the front side. The electrical conductor may be a metal wire and the projection may be formed by swaging the metal wire.

Figure 9:
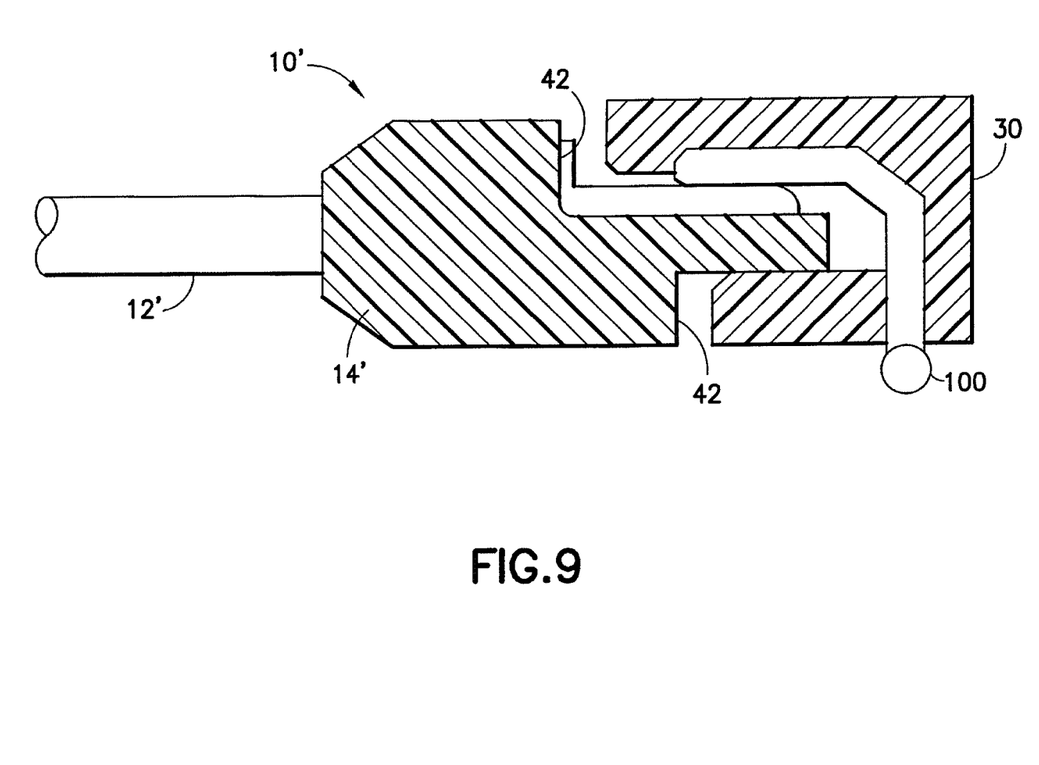
FIG. 9 is schematic cross sectional view of another assembly similar to FIG. 8, but showing the connector with a BGA solder element.

FIG. 9 shows an assembly similar to FIG. 8 but with a BGA solder element or surface mount 100.

It should be understood that the foregoing description is only illustrative. Various alternatives and modifications can be devised by those skilled in the art. For example, features from different embodiments described above could be selectively combined into a new embodiment. Accordingly, the description is intended to embrace all such alternatives, modifications and variances.

What is claimed is:

1. An assembly comprising:
at least two electrical wires each comprising an electrical conductor and electrical insulation surrounding the electrical conductor, where an end of the electrical conductor is not surrounded by the electrical insulation; and
a plug housing on the end of the at least two electrical wires to form an electrical connector, where the plug housing covers a bottom of the end of the electrical conductor and covers a first portion of a front side of the end of the electrical conductor, and where the plug housing does not cover a top of the end and does not cover a second portion of the front side such that the top of the end and the second portion are exposed to be able to electrically contact an electrical contact of a mating electrical connector,
where at least one of the electrical wires has a shorter length at the end than another one of the electrical wires.

2. An assembly as in claim 1 where the plug housing comprises an overmolded member which is overmolded onto the electrical insulation.

3. An assembly as in claim 1 where the electrical conductor has a general circular cross sectional shape along a majority of length of the end of the electrical conductor.

4. An assembly as in claim 1 where the first portion of the front side has a projection extending into the plug housing from the front side.

5. An assembly as in claim 4 where the electrical conductor is a metal wire and the projection comprises a swaged projection formed from the metal wire.

6. An assembly as in claim 4 where a rounded transition surface is provided between the front side of the end and the top of the end.

7. An assembly as in claim 1 where the at least two electricals wires comprises multiple electrical wires connected by the plug housing.

8. An electrical connector assembly comprising:
an assembly as in claim 1; and
a mating electrical connector having the electrical connector of the assembly connected thereto, where the mating electrical connector comprises:
a mating connector housing forming a mating connector receiving area; and
a plurality of electrical contacts connected to the mating connector housing, where the contacts each comprise a first end forming a mating connector connection end, and a second end forming a component connection end,
where the second end is adapted to be stationarily connected to an electrical component,
where the mating connector housing covers a first side of the first end of the electrical contact, where the housing covers a first portion of a front side of the first end of the electrical contact,
where the housing does not cover a second side of the first end of the electrical contact at the mating connector receiving area and does not cover a second portion of the front side of the electrical contact such that the second side and the second portion are exposed to electrically contact the electrical conductor of the at least two electrical wires inserted into the mating connector receiving area.

9. An electrical connector comprising:
a housing forming a mating connector receiving area; and
a plurality of electrical contacts connected to the housing, where the contacts each comprise a first end forming a mating connector connection end, and a second end forming a component connection end,
where the second end is adapted to be stationarily connected to an electrical component,
where the housing covers a first side of the first end of the electrical contact, where the housing covers a first portion of a front side of the first end,
where the housing does not cover a second side of the first end at the mating connector receiving area and does not cover a second portion of the front side such that the second side and the second portion are exposed to be able to electrically contact an electrical contact of a mating electrical connector inserted into the mating connector receiving area,
where the second side of the first end has a general concave cross section.

10. An electrical connector as in claim 9 where the second end comprises a mounting end configured to be connected to a printed circuit board.

11. An electrical connector as in claim 9 where the housing is insert molded onto the electrical contacts.

12. An electrical connector as in claim 9 where the mating connector receiving area is formed as a slot extending into a front of the housing between a top portion of the housing having the first end of the electrical contacts at a bottom side of the top portion, and a bottom portion located opposite and spaced from the top portion.

13. An electrical connector as in claim 9 where the electrical contacts have a general right angle shape.

14. An electrical connector comprising:
a housing forming a mating connector receiving area; and
a plurality of electrical contacts connected to the housing, where the contacts each comprise a first end forming a mating connector connection end, and a second end forming a component connection end,
where the second end is adapted to be stationarily connected to an electrical component,
where the housing covers a first side of the first end of the electrical contact, where the housing covers a first portion of a front side of the first end,
where the housing does not cover a second side of the first end at the mating connector receiving area and does not cover a second portion of the front side such that the second side and the second portion are exposed to be able to electrically contact an electrical contact of a mating electrical connector inserted into the mating connector receiving area,
where the first portion of the front side has a projection extending into the plug housing from the front side.

15. A method comprising:
providing at least two electrical wires each comprising an electrical conductor and electrical insulation surrounding the electrical conductor, where an end of the electrical conductor is not surrounded by the electrical insulation; and
molding a plug housing onto the end of the at least two electrical wires to form an electrical connector, where the plug housing covers a bottom of the end of the electrical conductor and covers a first portion of a front side of the end of the electrical conductor, and where the plug housing does not cover a top of the end and a second portion of the front side such that the top and second portion are exposed to be able to electrically contact an electrical contact of a mating electrical connector,
where at least one of the electrical wires has a shorter length at the end than another one of the electrical wires.

16. A method as in claim 15 where the plug housing is overmolded onto the electrical insulation.

17. A method as in claim 15 where providing the at least two electrical wires comprises providing the first portion of the front side with a projection which extends into the plug housing from the front side.

18. A method as in claim 17 where the electrical conductor is a metal wire and the projection is formed by swaging the metal wire.

\* \* \* \* \*